April 29, 1958 A. MASON ET AL 2,832,319
TWO STAGE SERVO VALVE
Filed Nov. 15, 1954 5 Sheets-Sheet 1

INVENTOR.
AVREL MASON
MELVIN S. FEDER
BY FREDERICK L. WICHMAN

ATTORNEY

April 29, 1958  A. MASON ET AL  2,832,319
TWO STAGE SERVO VALVE

Filed Nov. 15, 1954  5 Sheets-Sheet 2

INVENTOR.
AVREL MASON
MELVIN S. FEDER
BY FREDERICK L. WICHMAN
ATTORNEY

April 29, 1958

A. MASON ET AL 2,832,319

TWO STAGE SERVO VALVE

Filed Nov. 15, 1954

INVENTOR.
AVREL MASON
MELVIN S. FEDER
BY FREDERICK L. WICHMAN

*Vett Parsigian*
ATTORNEY

April 29, 1958 A. MASON ET AL 2,832,319
TWO STAGE SERVO VALVE
Filed Nov. 15, 1954 5 Sheets-Sheet 4

INVENTOR.
AVREL MASON
MELVIN S. FEDER
BY FREDERICK L. WICHMAN

ATTORNEY

United States Patent Office 2,832,319
Patented Apr. 29, 1958

2,832,319

TWO STAGE SERVO VALVE

Avrel Mason, Birmingham, Melvin S. Feder, Detroit, and Frederick L. Wichman, Royal Oak, Mich., assignors to Bendix Aviation Corporation, Detroit, Mich., a corporation of Delaware Application November 15, 1954, Serial No. 468,742

2 Claims. (Cl. 121—46.5)

This invention relates to a valve for controlling the flow of fluid and more particularly to a two-stage servo valve for controlling the flow of fluid.

In the past, various types of two-stage servo valves have been used for controlling the flow of fluid to a load. Such valves have not been entirely successful for certain applications because of their lack of stability at high fluid pressures and high flow rates. Furthermore, such valves have been relatively expensive to produce because of the close tolerances required in the valve to provide accurate control.

This invention provides a two-stage servo valve which is stable in its operation over a wide range of fluid pressures and flow rates and is relatively inexpensive to produce. The valve includes a movable plate disposed between a pair of fixed plates. A flapper assembly disposed adjacent to a pair of orifices provided in the movable plate is operative to produce a differential in pressure at the orifices and a corresponding differential in pressure on opposite sides of the plate to move the plate. The plate moves a particular distance in a direction to reduce the pressure differential to zero and to open the valve for the passage of fluid.

An object of this invention is to provide a two-stage servo valve for controlling the flow of fluid.

Another object of this invention is to provide a valve of the above character having mechanical feedback without the use of mechanical linkages.

A further object is to provide a valve of the above character including a flapper assembly for operating to produce a differential in pressure between two orifices provided in a pilot stage so as to open a power stage for the passage of fluid through the valve.

Still another object is to provide a valve of the above character which is stable in its operation over a wide range of fluid pressures and flow rates and is relatively inexpensive to produce.

Other objects and advantages will be apparent from a detailed description of the invention and from the appended drawings and claims.

Figure 1:
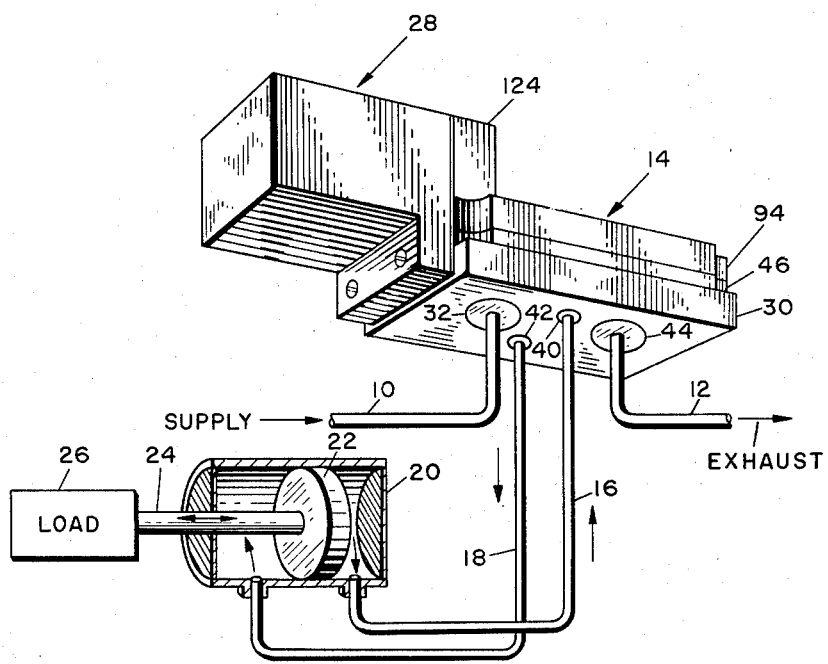
Figure 1 is a schematic diagram of a system which includes a valve constituting one embodiment of the invention for controlling the flow of fluid in the system.

In one embodiment of the invention, a supply line 10 and an exhaust line 12 are connected to a valve generally indicated at 14. Also connected to the valve 14 are lines 16 and 18, the opposite ends of which are connected to the right and left sides of a power stage, such as a piston chamber 20.

A piston 22 positioned in the chamber 20 is connected by means of a rod 24 to a load 26 for driving the load upon a movement of the piston 22 within the chamber. A torque motor generally indicated at 28 is mounted on the valve 14 to operate the valve in a manner to be hereinafter described.

Figure 3:
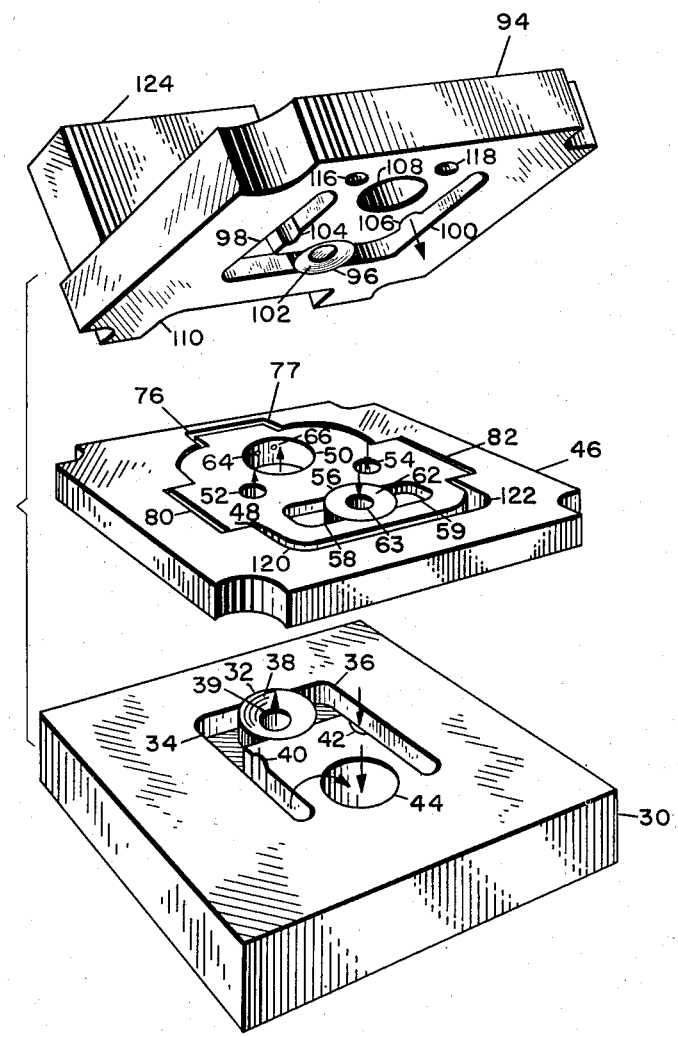
Figure 3 is an exploded view of the valve in Figure 1, illustrating the structure of the component parts of the valve.

The valve 14 is provided with a lower plate 30 having an opening 32 which extends through the plate 30 and communicates with the supply line 10. Channels 34 and 36 (Figure 3) are provided in the upper portion of the plate 30 in communication with the opening 32. A bushing 38, inserted into the upper portion of the opening 32, blocks any direct communication between the channels 34 and 36 and the opening 32. The bushing 38 has a hole 39 extending through it. Ports 40 and 42, which communicate with the channels 34 and 36, respectively, extend through the plate 30 and are connected to lines 16 and 18, respectively. An opening 44 extending through the plate 30 is connected to the exhaust line 12.

Fixedly positioned upon the lower plate 30 is a middle plate 46. The plate 46 is provided with an opening for receiving a shuttle plate 48 (Figure 3) which is movable within the opening relative to the plate 46. Extending through the shuttle plate 48 is an opening 50 which is aligned with the opening 32 in the plate 30 and the bushing 38 upon a neutral positioning of the plate 48 relative to the plate 46. Ports 52 and 54 extending through the plate 48 are aligned with the ports 40 and 42, respectively, in the lower plate 30. An opening 56 extending through the plate 48 is aligned with the opening 44 in the plate 30 when the shuttle plate 48 is in its neutral position. Channels 58 and 59 (Figure 5) are provided in the upper portion of the plate 48 in communication with the opening 56 and channels 60 and 61 (Figure 6) are provided in the lower portion of the plate in communication with the opening 56. A bushing 62, inserted into the opening 56, blocks any direct communication between the channels 58, 59, 60 and 61 and the opening 56. The bushing 62 has a hole 63 extending through it.

From the inner surface of the opening 50, ports 64 and 66 (Figure 3) extend internally into the shuttle plate 48 and communicate with chambers 68 and 70 (Figure 7), respectively, provided internally in the plate 48. Extending from the chambers 68 and 70, respectively, are internal lines 72 and 73 having orifices 74 and 75 which open into communication with spaces 76 and 77, respectively, between the plate 48 and the plate 46. Also extending from the chambers 68 and 70 are internal lines 78 and 79 which communicate respectively with spaces 80 and 82 located on opposite sides of the plate 48 between the plates 48 and 46. An internal line 81 extends through the plate 48 and the bushing 62 and communicates with the hole 63 of the bushing.

A flapper assembly generally indicated at 84 (Figure 5) is connected to a shaft 86 of the torque motor 28. The flapper 84 is provided with a yoke 88 having oppositely disposed legs 90 and 92 positioned for movement in the spaces 76 and 77, respectively, provided between the shuttle plate 48 and plate 46 adjacent to the orifices 74 and 75, respectively.

Figure 2:
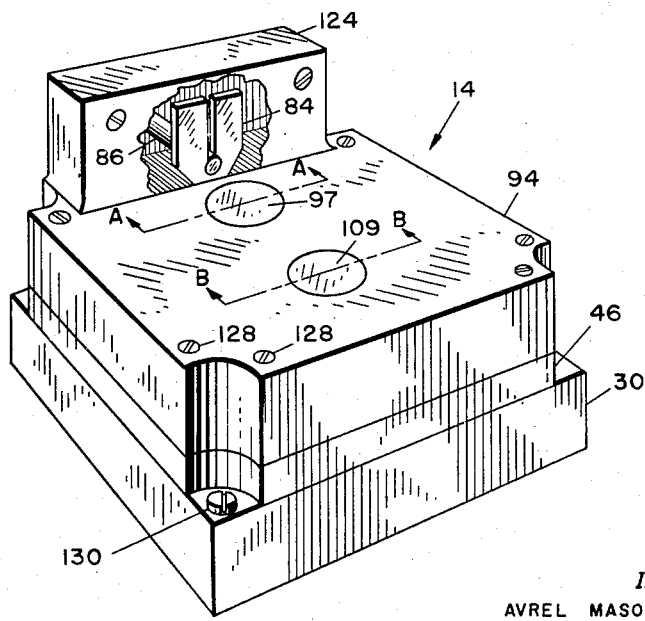
Figure 2 is an enlarged perspective view, partly broken away, of the valve shown in Figure 1.

An upper plate 94 is fixedly positioned upon the middle plate 46. Extending through the plate 94 is an opening 96 which is plugged at its upper end by a plug 97 (Figure 2). The opening 96 is aligned with the opening 50 in the plate 48 when the plate is in its neutral position. Channels 98 and 100 are provided in the lower portion of the plate 94 in communication with the opening 96. A bushing 102, inserted into the opening 96, blocks any communication between the channels 98 and 100 and the opening 96. Ports 104 and 106 communicate with the channels 98 and 100, respectively, and extend into the plate 94 to substantially the depth of the channels. The ports 104 and 106 are aligned with the ports 52 and 54, respectively, in the plate 48. Extending through the plate 94 is an opening 108 which is plugged at its upper end by a plug 109 (Figure 2). The opening 108 is aligned with the opening 56 in the plate 48 when the plate is in its neutral position.

Figure 4:
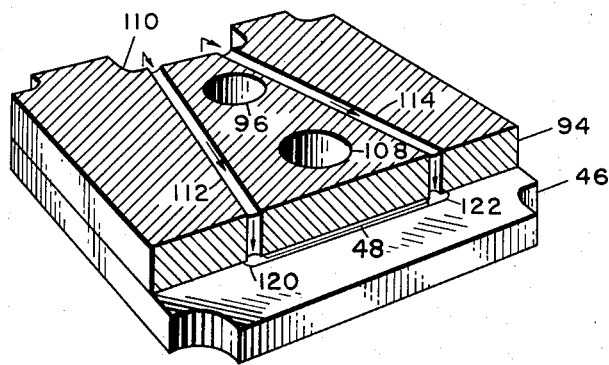
Figures 4 and 5 are sectional views of certain component parts shown in Figure 3.

A groove 110 (Figure 4) is provided in the plate 94 to receive the upper portion of the flapper assembly 84. Lines 112 and 114 communicate with the groove 110 and extend internally into the plate 94. The lines 112 and 114 open at 116 and 118 (Figure 3), respectively, into communication with spaces 120 and 122 between the plate 48 and the plate 46. The spaces 120 and 122 communicate with the line 81.

Figure 7:
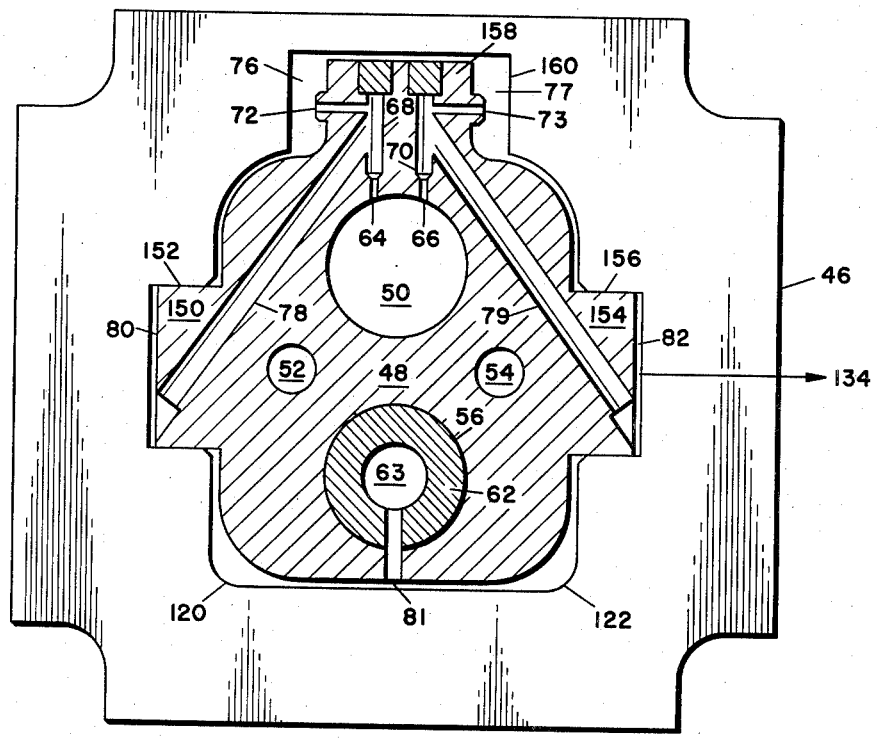
Figure 7 is an enlarged sectional view of certain component parts shown in Figure 3.

Figure 7 more clearly shows the shape of the plate 48 and the opening in the plate 46 and also shows their cooperation to define the fluid chambers or spaces 76, 77, 80, 82, 120 and 122. An extended portion 150 provided on the plate 48 is snugly received into a corresponding groove 152 in the plate 46 to define the chamber 80. The chamber 80 is substantially fluid tight because of the snug fit of the sides of the portion 150 against the sides of the groove 152. Similarly, the substantially fluid tight chamber 82 is formed by a snug cooperation between an extended portion 154 on the plate 48 and a groove 156 in the plate 46. Another extended portion 158 provided on the plate 48 is received into a corresponding groove 160 in the plate 46 to define the chambers 76 and 77 which respectively receive the arms 92 and 94 of the flapper 84. Opposite the portion 158 the plate 48 is curvilinear in shape and cooperates with the plate 46 to define the chambers 120 and 122. Fluid under pressure in the chambers 120 and 122 will leak between the plates 46 and 48 into the line 81 for introduction to the hole 63 in the bushing 62.

A housing 124 encloses the flapper 84 and the shaft 86 which extends through a wall of the housing to the torque motor 28. The plates 30, 46 and 94 may be held in fixed relationship to one another by suitable means such as by screws 128 (Figure 2) and the entire valve assembly may be supported in fixed relationship to other apparatus by suitable means, such as by screws 130 extending through the plate 30.

The apparatus disclosed above is primed before it is placed into operation, that is, all of the passages in the apparatus are filled with a fluid, such as oil. For example, the piston chamber 20 and the passages in the valve 14 are filled with oil. To place the valve 14 in readiness for operation, oil under pressure is introduced through the supply line 10.

As previously disclosed, when the plate 48 is in its neutral position relative to the plate 46, the opening 50 in the plate 48 is directly aligned with the bushing 102 in the plate 94. In this neutral position of the plate 48, any oil flow through the valve 14 is blocked by the passageway including the opening 32, the hole 39 in the bushing 38, the opening 50 and the bushing 102. Since the opening 50 is aligned with the bushings 38 and 102, no oil can flow into the channels 34, 36, 98 or 100. However, oil does flow through the ports 64 and 66 provided in the plate 48 in communication with the opening 50.

The oil flowing through the ports 64 and 66 is introduced into the chambers 68 and 70, respectively. The oil in the chamber 68 flows through the line 72 and the orifice 74 into the space 76 within the housing 124 adjacent to the arm 90 of the flapper 84. Similarly, the oil in the chamber 70 flows through the line 73 and the orifice 75 into the space 77 within the housing 124 adjacent to the arm 92 of the flapper 84.

During the period that no signal is applied to the torque motor 28 to rotate the shaft 86, the flapper 84 is maintained in a substantially vertical or null position and the arms 90 and 92 are positioned at equal distances from the orifices 74 and 75, respectively. As a result, substantially equal amounts of oil flow through the orifices 74 and 75 and the pressure at each orifice is substantially the same.

Since the pressure at the orifices 74 and 75 is the same, the oil pressures in the lines 78 and 79 in communication with the chambers 68 and 70 are substantially the same and the oil pressures in the spaces 80 and 82 are also the same. Since the pressures in the spaces 80 and 82 are equal, the plate 48 does not move but is maintained in its neutral position.

The oil flowing out of the orifices 74 and 75 into the housing 124 is introduced into lines 112 and 114 which communicate with the groove 110. The oil in the lines 112 and 114 flows through the ports 116 and 118 into the spaces 120 and 122 between the plate 48 and the plate 46. From the spaces 120 and 122 the oil flows through the line 81 to the hole 63 in the bushing 62 and through the opening 44 in the plate 30 and out of the exhaust 12.

The flapper arms 90 and 92 may be moved particular distances from their null positions in either a clockwise or counterclockwise direction by applying a proper control signal to the torque motor, such as may be applied from suitable control circuits (not shown) which are well known to persons skilled in the art. In one valve which has been constructed, the flapper arms 90 and 92 may be moved distances ranging from 0 to 20 mils in either direction from their vertical or neutral positions. Actually, the arcuate movements of the arms 90 and 92 are substantially linear because of the relatively small movements involved.

Figure 5:
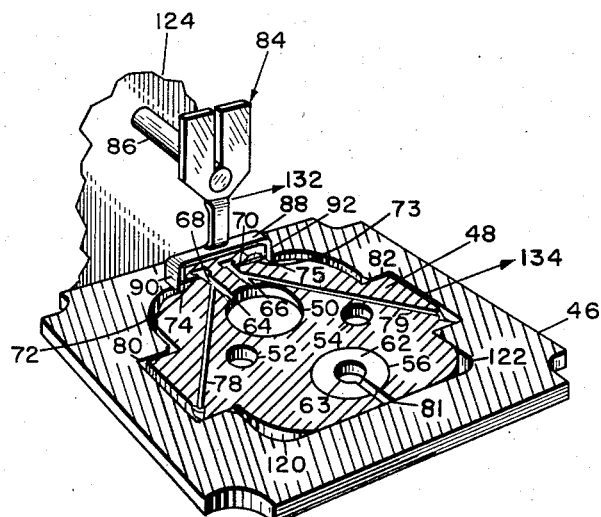
Figure 6:
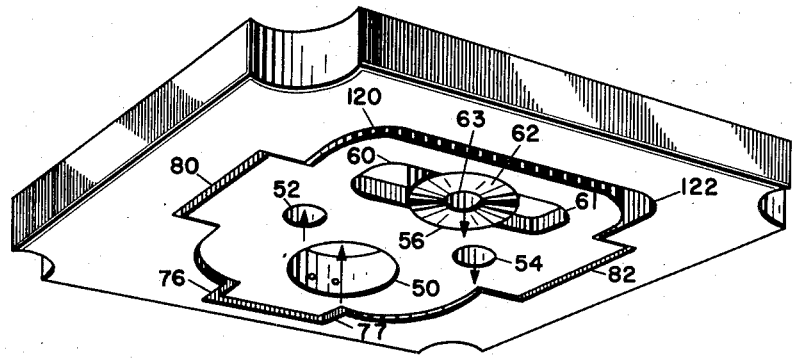
Figure 6 is a different view of certain component parts shown in Figure 3.

When it is desired to move the piston 22 and the load 26 to the right, a signal is applied to the torque motor 28 to rotate the shaft 86 and the flapper 28 a particular distance in a counterclockwise direction as indicated by the arrow 132 in Figure 5. Upon a movement of the flapper arms a particular distance, such as 10 mils in a counterclockwise direction, the arm 90 moves away from the orifice 75 a distance of 10 mils. Since this causes the orifice 74 to become further obstructed by the arm 90, the pressure at the orifice is increased and the pressures in the line 78 and the space 80 also become increased. The oil pressure in the space 82 becomes correspondingly decreased because the pressure at the orifice 75 is reduced when the obstructing arm 92 is moved away from the orifice. Since the pressure in the space 80 is greater that the pressure in the space 82, the plate 48 is made to move in the direction of the arrow 134. When the plate 48 reaches a position such that the orifices 74 and 75 are again equidistant from the flapper arms 90 and 92, the plate stops any further movement because the pressure in the spaces 80 and 82 becomes equalized.

Figure 9A:
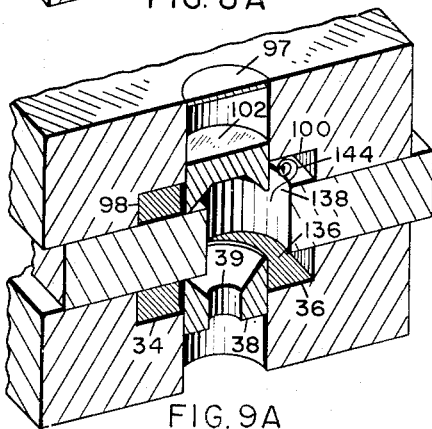
Figure 9B:
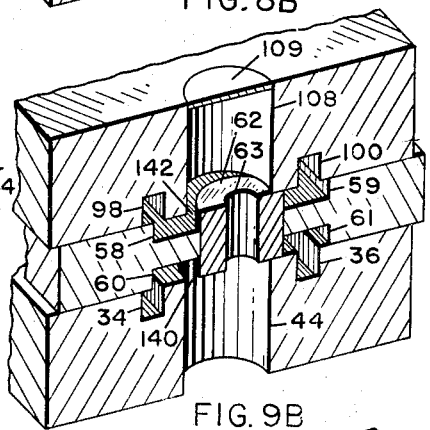
Figure 10A:
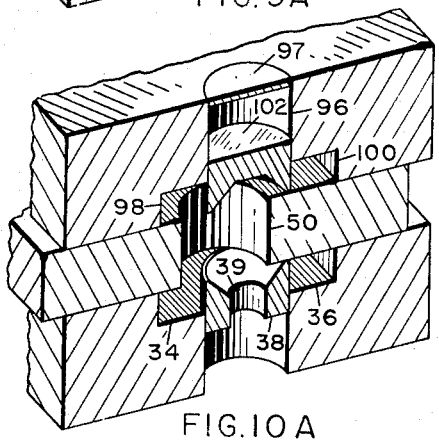
Figure 10B:
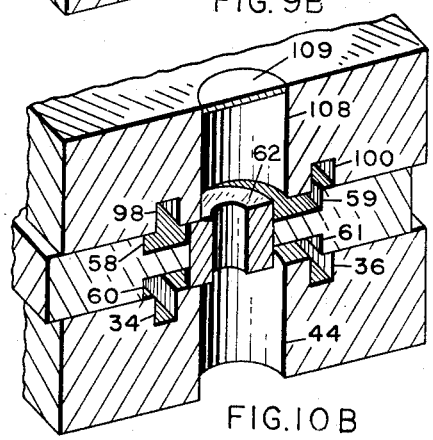

When the plate 48 is moved in the direction of the arrow 134, the plate 48 becomes displaced relative to the lower plate 30 and the upper plate 94 as illustrated in Figures 9A and 9B of the drawings. In this position of the plate 48, an orifice 136 is provided between the opening 50 and the channel 36 and an orifice 138 is provided between the opening 50 and the channel 100. Similarly, an orifice 140 is provided between the opening 44 and the channel 60 and an orifice 142 is provided between the opening 108 and the channel 58.

Because of the provision of the orifices disclosed above, oil flows in a circuit including the supply line 10, the opening 32, the hole 39 in the bushing 38, the opening 50, the orifice 136, the channel 36, the port 42, the line 18, the left side of the piston chamber 20, the right side of the piston chamber 20, the line 16, the port 40, the channel 34, the channel 60, the orifice 140, the opening 44 and the exhaust line 12. Oil also flows in a circuit including the supply line 10, the opening 32, the hole 39 in the bushing 38, the opening 50, the orifice 138, the channel 100, the port 106, the port 54, the post 42, the line 18, the left and right sides of the piston chamber 20, the line 16, the port 40, the port 52, the channel 98, the channel 58, the orifice 142, the opening 108, the hole 63 in the bushing 62, the opening 44 and the exhaust line 12.

The oil flow in the circuits disclosed above produces a movement to the right of the piston 22 and the load 26. This oil flow continues until the plate 48 is returned to its neutral position upon a removal of the control signal from the torque motor 28. When the control signal is removed, the flapper 84 returns to its vertical or null position and the differential of pressure produced between the spaces 82 and 80, in the manner previously disclosed, causes the plate 48 to be returned to its neutral position, thus blocking the flow of oil to the piston chamber 20.

Figure 8A:
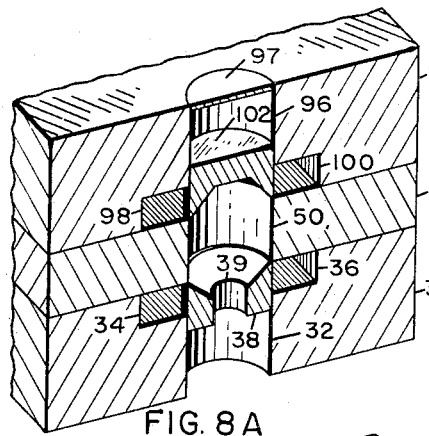
Figures 8A, 9A and 10A are sectional views, partly broken away, taken substantially at A—A of Figure 2, illustrating the relative positions of certain component parts in the valve under different operating conditions.
Figure 8B:
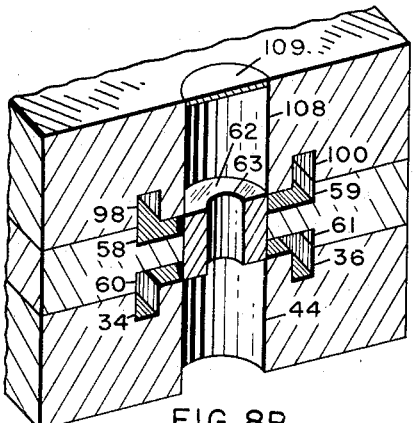
Figures 8B, 9B and 10B are sectional views partly broken away taken substantially at B—B of Figure 2 illustrating the relative positions of certain component parts in the valve under the same conditions shown in Figures 8A, 9A and 10A, respectively.

When it is desired to move piston 22 and the load 26 to the left, an opposite control signal is applied to the torque motor 28 to turn the shaft 86 and the flapper assembly 84 in a clockwise direction so as to produce a displacement of the plate 48 relative to the plate 30 and the plate 94 as illustrated in Figure 8 in the drawings. In this way, oil flows in two circuits similar to those disclosed above, the flow being in a direction to drive the piston 22 to the left.

The valve 14 disclosed above maintains its stability over a relatively wide range of fluid pressures and flow rates because it utilizes the principle of "convergent flow" porting as fully disclosed in co-pending application Serial No. 375,601, filed August 21, 1953, by John R. Farron and Melvin S. Feder. Since any turbulence in the oil flow occurs after the oil is metered through an orifice, it is important to have the turbulence occur against the solid structure of a valve housing where it cannot affect the stability of a movable portion of the valve. In the valve 14, the oil is always metered against the solid structure of the valve. For example, oil flowing from the opening 50 to the channel 100 is metered through the orifice 138 and the turbulent flow 144 acts against the fixed plate 94 and does not affect the stability of the movable plate 48.

The servo valve disclosed above has several important advantages. As previously disclosed, the servo valve is stable in its operation over a wide range of fluid pressures and flow rates because of the "convergent flow" porting provided in the valve. The pilot stage in the valve is an extremely simple assembly requiring parts of very little precision, thus, reducing considerably the expense in producing such a valve as compared to other two-stage servo valves.

Since the flapper arms are suspended from the shaft of a torque motor and are adjacent to the orifices in the pilot stage, there is no friction in the pilot stage as is present in other types of servo valves. The elimination of such friction is instrumental in providing an assembly which is simple and inexpensive to construct. Because of the simplicity of the flapper assembly, it is extremely simple to make adjustments in a system to achieve various dynamic responses. For example, the position of the flapper arms adjacent to their respective orifices may be adjusted to obtain the performance desired.

The internal mechanical feedback between the power stage and the pilot stage eliminates the need for a considerable amount of electronic equipment utilized in other types of servo valves and further reduces its cost. Because of the positioning of the torque motor to produce a rotation of the flapper assembly, the torque motor is sealed off from the oil system in the valve so that metallic wear particles cannot come in contact with the pole pieces of the torque motor to deteriorate the operation of the torque motor. The valve constituting this invention combines flexibility with a high degree of simplicity and cheapness of manufacture and represents considerable advantages over two-stage servo valves presently in use.

It will be recognized by persons skilled in the art that the servo valve disclosed above can be utilized for valves other than the plate valve disclosed above. For example, a similar arrangement may be adapted for use in rotary plate valves or in spool type valves. Furthermore, it will be recognized that the flapper need not necessarily rotate axially. For example, the flapper may be made to operate about a horizontal axis should this prove desirable. Also, the valve may be designed to have the orifices 74 and 75 facing each other so that a single flapper arm may be used to produce a difference in pressure at the orifices.

It will further be recognized by persons skilled in the art that this invention may be used for applications other than for controlling the flow of fluid. For example, with minor modifications, the above disclosed apparatus may be used as an actuator to produce a controlled movement of an object connected to the shuttle plate 48.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A valve, including, a first plate, an opening in the first plate, means for introducing a fluid under pressure to the opening in the first plate, a second plate disposed in parallel relationship to the first plate, an opening in the second plate, a third plate disposed in the opening of the second plate to define first and second chambers on opposite sides of the third plate, the third plate being movable relative to the second and first plates, an opening in the third plate disposed to receive fluid from the opening in the first plate, a fourth plate disposed in parallel relationship to the second plate and in fixed relationship to the first and second plates, an opening in the fourth plate to communicate with the opening in the third plate upon a movement of the third plate from a neutral position relative to the first and second plates and to provide for the passage of fluid from the opening in the third plate, first and second lines communicating with the opening in the third plate and extending internally through the third plate and communicating with the first and second chambers, respectively, to produce fluid pressures in the chambers and to produce a movement of the third plate relative to the first, second and fourth plates in accordance with any difference in the fluid pressures in the first and second chambers, first and third orifices in the second plate communicating with the first and third lines for passing out of the plate the fluid received by the first and second lines from the opening in the plate, first and second flapper arms disposed adjacent to the first and second orifices, respectively, and movable as a unit relative to the orifices to control the fluid pressures in the lines and in the chambers in accordance with the positioning of each flapper arm relative to its adjacent orifice, the flapper arms being normally disposed at substantially equal distances from the orifices in the neutral position of the third plate to produce substantially equal pressures in the first and second lines and in the first and second chambers for maintaining the second plate in its neutral position, and means for moving the flapper arms from their normal position to reduce the distance between the first flapper arm and the first orifice and to increase the distance between the second flapper arm and the second orifice for producing a difference in the pressures in the first and second chambers to produce a movement of the second plate in a direction to equalize the pressures in the chambers and to provide for a communication between the opening in the fourth plate with the opening in the third plate.

2. A valve, including, a first plate, first and second openings in the first plate, first and second channels in the first plate, means for introducing a fluid under pressure to the first opening in the first plate, a second plate disposed in contiguous relationship to the first plate and movable relative to the first plate, a housing disposed to define first and second chambers on opposite sides of the second plate, a first opening in the second plate disposed to receive fluid introduced to the first opening in the first plate and disposed to communicate with the second channel in the first plate upon a movement of the second plate from a null position, a circuit connected between the second and first channels in the first plate, a load in the circuit for displacement in accordance with a flow of fluid through the circuit, a second opening in the second plate disposed to receive fluid from the first channel in the first plate and disposed to communicate with the second opening in the first plate upon a movement of the second plate from its null position, first and second lines communicating with the first opening in the second plate and extending internally through the second plate and communicating with the first and second chambers to produce fluid pressures in the chambers and to produce a movement of the second plate relative to the first plate in accordance with any differences in fluid pressures in the first and second chambers, first and second orifices in the second plate in communication with the first and second lines, respectively, for passing out of the plate the fluid received by the first and second lines from the first opening in the plate, first and sceond flapper arms disposed adjacent to the first and second orifices, respectively, and movable as a unit relative to the second plate to control the fluid pressures in the first and second lines and in the first and second chambers in accordance with the positioning of each flapper arm relative to its adjacent orifice, the flapper arms being normally disposed relative to the orifices, in the null position of the second plate, to produce substantially equal fluid pressures in the first and second chambers for maintaining the second plate in its null position, means for moving the flapper arms a particular distance from their normal position to produce a difference in pressure in the first and second chambers for a movement of the second plate the particular distance from its null position to reduce the pressure differential in the lines to zero and to provide for a flow of fluid in the circuit to displace the load in accordance with the movement of the second plate relative to the first plate.

References Cited in the file of this patent

UNITED STATES PATENTS

| | | |
|---|---|---|
| 261,485 | Royce | July 18, 1882 |
| 2,249,508 | Warner | July 15, 1941 |
| 2,633,103 | Oliver | Mar. 31, 1953 |

FOREIGN PATENTS

| | | |
|---|---|---|
| 910,115 | France | Jan. 21, 1945 |